US010746861B2

(12) United States Patent
Tong

(10) Patent No.: US 10,746,861 B2
(45) Date of Patent: Aug. 18, 2020

(54) APPARATUS FOR DETECTION AND RANGING

(71) Applicant: NXP B.V., Eindhoven (NL)

(72) Inventor: Ziqiang Tong, Ottobrunn (DE)

(73) Assignee: NXP B.V., Eindhoven (NL)

( * ) Notice: Subject to any disclaimer, the term of this patent is extended or adjusted under 35 U.S.C. 154(b) by 309 days.

(21) Appl. No.: 15/908,958

(22) Filed: Mar. 1, 2018

(65) Prior Publication Data

US 2018/0252802 A1    Sep. 6, 2018

(30) Foreign Application Priority Data

Mar. 6, 2017 (EP) .................................. 17159347

(51) Int. Cl.
*G01S 13/26* (2006.01)
*G01S 13/931* (2020.01)
*G01S 13/30* (2006.01)
*G01S 13/34* (2006.01)

(52) U.S. Cl.
CPC .............. *G01S 13/26* (2013.01); *G01S 13/30* (2013.01); *G01S 13/347* (2013.01); *G01S 13/931* (2013.01)

(58) Field of Classification Search
CPC combination set(s) only.
See application file for complete search history.

(56) References Cited

U.S. PATENT DOCUMENTS

| 5,914,683 | A | 6/1999 | O'Conner | |
|---|---|---|---|---|
| 9,753,121 | B1 * | 9/2017 | Davis | ........... G01S 13/70 |
| 2010/0033364 | A1 | 2/2010 | Kishida et al. | |
| 2011/0181300 | A1 * | 7/2011 | Bowring | ........... G01S 7/024 324/637 |
| 2011/0248882 | A1 * | 10/2011 | Coppi | ........... G01S 13/32 342/156 |
| 2012/0044479 | A1 * | 2/2012 | Roulston | ........... G01J 3/108 356/51 |
| 2012/0229323 | A1 | 9/2012 | Kato et al. | |
| 2013/0113647 | A1 * | 5/2013 | Sentelle | ........... G01S 13/32 342/22 |

(Continued)

OTHER PUBLICATIONS

Carts, M., "Very High Resolution Radar at 300 GHz", Proceedings of the 44th European Microwave Conference, Oct. 6-9, 2014.

(Continued)

*Primary Examiner* — Mamadou L Diallo

(57) ABSTRACT

An apparatus configured to provide for detection and ranging of a remote object, the apparatus configured to perform the following: based on a first reflected signal comprising a reflection from the remote object of a first frequency varying detection signal that varies in frequency over a first bandwidth; and based on a second reflected signal comprising a reflection from the remote object of a second frequency varying detection signal that varies in frequency over a different second bandwidth; determine a first estimated range based on a first beat frequency signal comprising the first reflected signal mixed with the first frequency varying detection signal; determine a second estimated range based on a second beat frequency signal comprising the second reflected signal mixed with the second frequency varying detection signal; determine a range of the remote object as a function of the first estimated range and the second estimated range.

20 Claims, 3 Drawing Sheets

(56) References Cited

U.S. PATENT DOCUMENTS

2015/0355321 A1  12/2015  Yukumatsu
2016/0139257 A1   5/2016  Yamashina
2017/0153318 A1*  6/2017  Melzer ................. G01S 7/4008

OTHER PUBLICATIONS

Hyun, E., "Adaptive FMCW Radar with Adaptive Range Resolution", 2008 Second International Conference on Future Generation Communication and Networking Symposia.
Stein, W., "Phase Modulated 61 GHz Backscatter Transponder for FMCW Radar-Based Ranging", VDE Verlag GmbH • Berlin • Offenbach, Germany, GeMiC 2014.

* cited by examiner

Figure 1
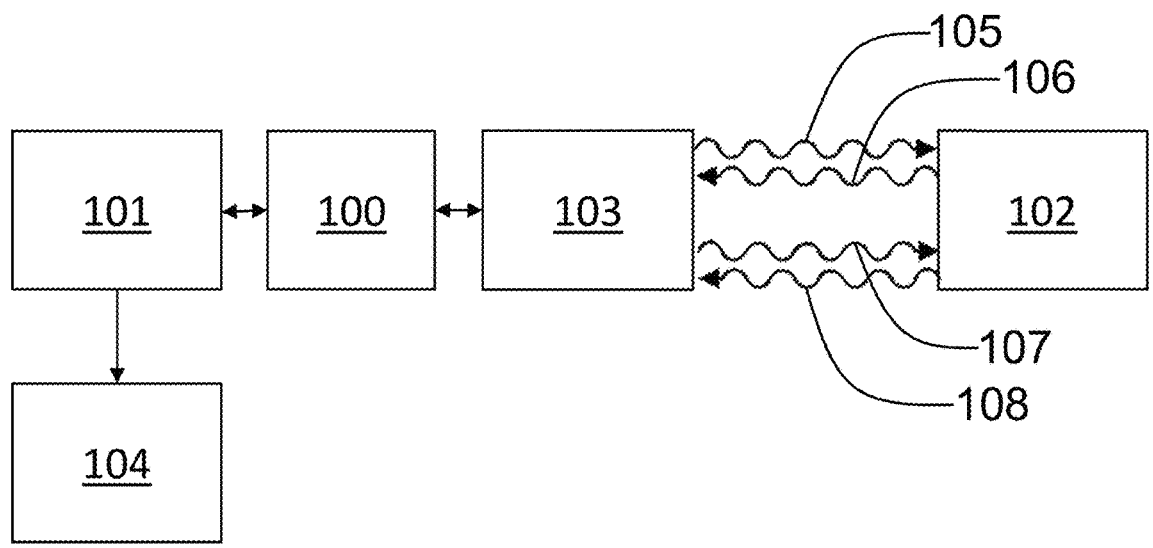
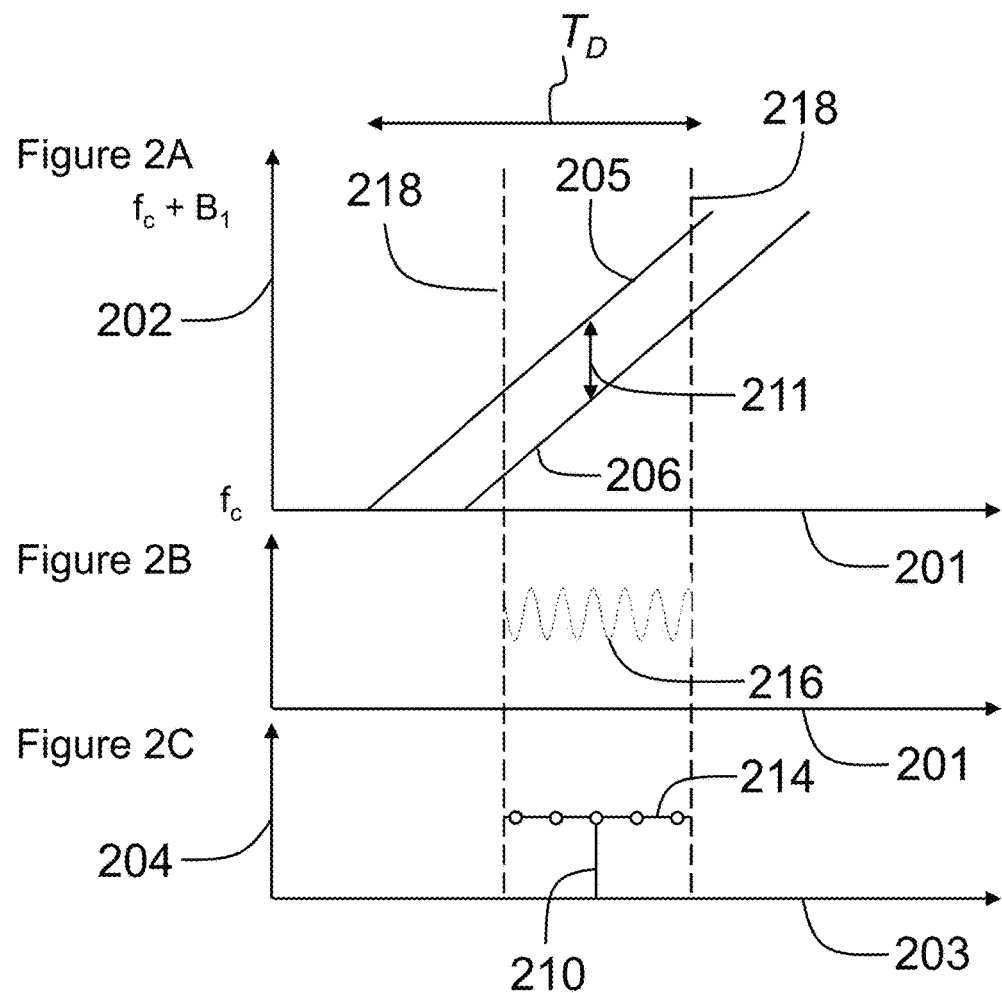
Figure 2A
Figure 2B
Figure 2C

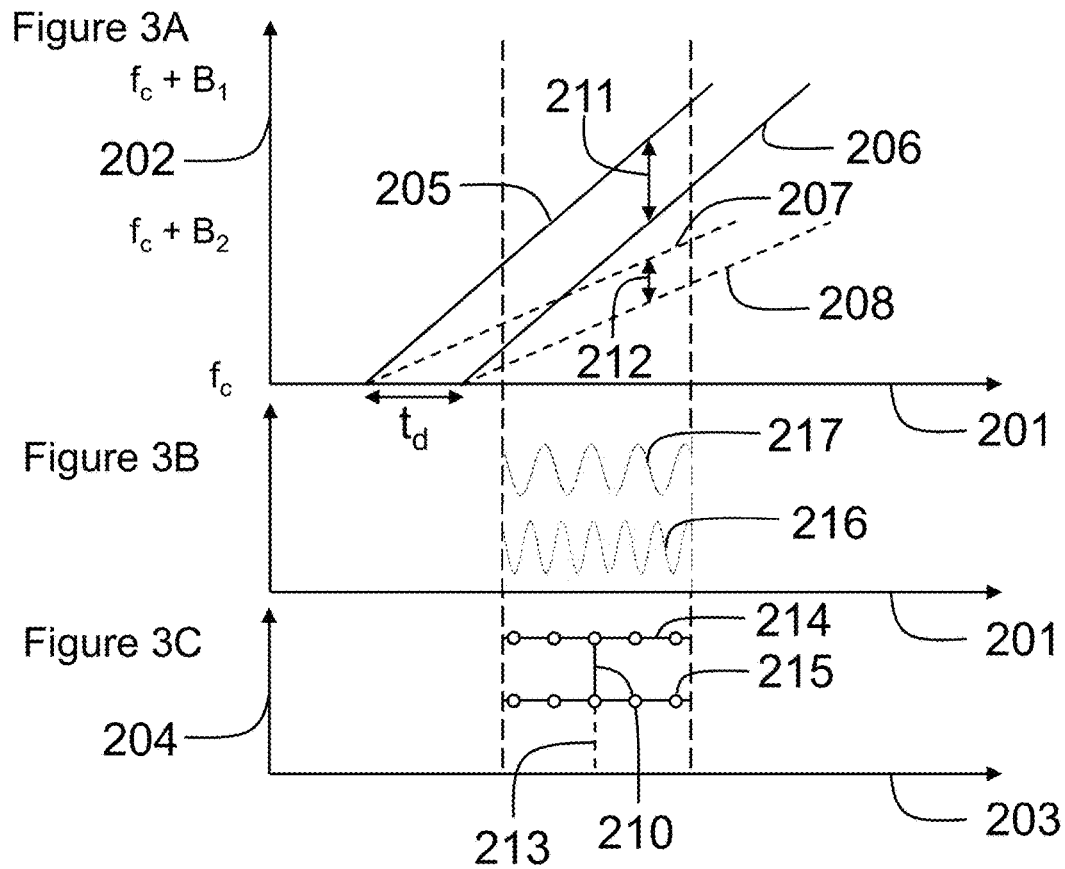
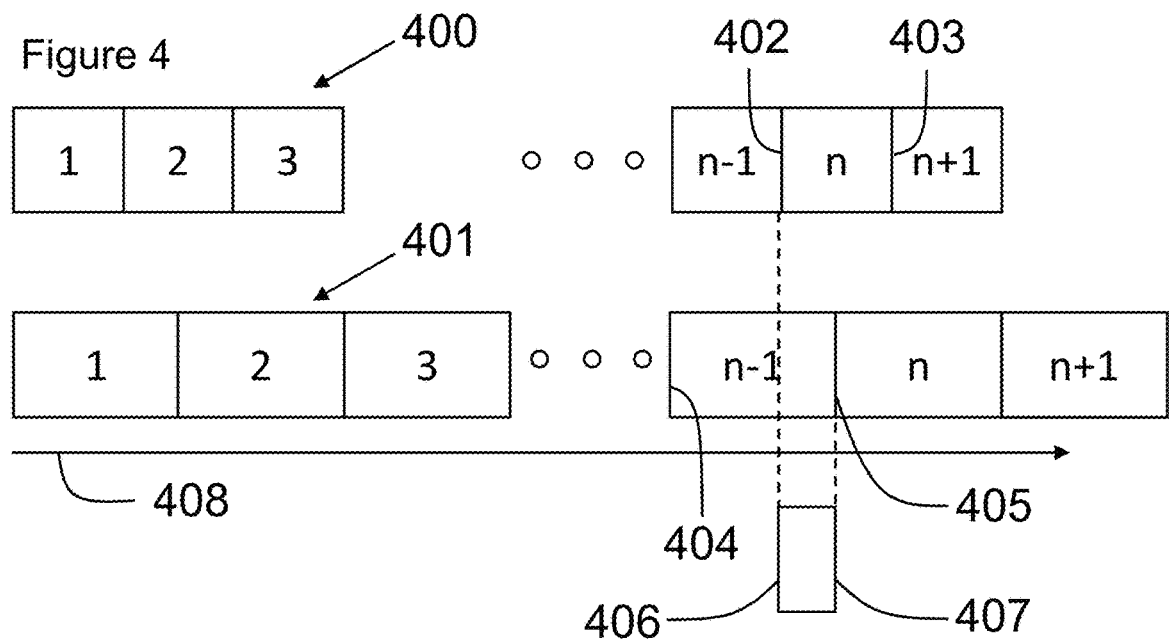

APPARATUS FOR DETECTION AND RANGING

CROSS-REFERENCE TO RELATED APPLICATIONS

This application claims the priority under 35 U.S.C. § 119 of European Patent application no. 17159347.8, filed on 6 Mar. 2017, the contents of which are incorporated by reference herein.

The present disclosure relates to an apparatus for detection and ranging of a remote object. It also relates to associated methods and computer programs.

According to a first aspect of the present disclosure there is provided an apparatus configured to provide for detection and ranging of a remote object, the apparatus configured to perform the following:

- based on a first reflected signal comprising a reflection from the remote object of a first frequency varying detection signal, the first frequency varying detection signal comprising a signal that varies in frequency over a first bandwidth; and
- based on a second reflected signal comprising a reflection from the remote object of a second frequency varying detection signal, the second frequency varying detection signal comprising a signal that varies in frequency over a second bandwidth, different from the first bandwidth;
- determine a first estimated range based on a first beat frequency signal obtained by mixing the first reflected signal and the first frequency varying detection signal, the first estimated range having a first resolution by virtue of the first bandwidth of the first frequency varying detection signal;
- determine a second estimated range based on a second beat frequency signal obtained by mixing the second reflected signal and the second frequency varying detection signal, the second estimated range having a second resolution by virtue of the second bandwidth of the second frequency varying detection signal;
- determine a range of the remote object as a function of the first estimated range and the second estimated range.

In one or more embodiments, determining a range to the remote object as a function of the first and second estimated ranges may provide for determination of a range having a higher resolution than the resolution of the component, first and second, estimates of range.

In one or more embodiments the apparatus is configured to: determine a first spread of ranges based on the first estimated range and the resolution of the first estimated range according to the first bandwidth; determine of a second spread of ranges based on the second estimated range and the resolution of the second estimated range according to the second bandwidth; wherein the resolution, $\Delta R$, is calculated as a function of the bandwidth, B, and the speed of light, c, using:

$$\Delta R = c/(2B),$$

and wherein the range of the remote object comprises a function based on an overlap in the first and second spread of ranges.

In one or more embodiments the first estimated range is based on a first dominant frequency component of the first beat frequency signal and the second estimated range is based on a second dominant frequency component of the second beat frequency signal.

In one or more embodiments the dominant frequency component may comprise the frequency component of the beat frequency signal having the highest corresponding amplitude.

In one or more embodiments, the dominant frequency component may comprise the frequency component of the beat frequency signal having an amplitude above a threshold, the threshold comprising an absolute threshold or a threshold related to one or more amplitudes of the beat frequency signal.

In one or more embodiments, the apparatus is configured to convert the first dominant frequency component, $f_{B1}$, of the first beat frequency signal to the first estimated range, $R_1$, as a function of the speed of light, c, the first total sweep time, $T_{D1}$, wherein the first total sweep time is the period over which the first frequency varying detection signal is transmitted, and the first bandwidth, $B_1$ as follows:

$$R_1 = \frac{cT_{D1}f_{B1}}{2B_1}$$

and the apparatus is configured to covert the second dominant frequency component, $f_{B2}$, of the second beat frequency signal to the second estimated range, $R_2$, as a function of the speed of light, c, the second total sweep time, $T_{D2}$, wherein the second total sweep time is the period over which the second frequency varying detection signal is transmitted, and the second bandwidth $B_2$ as follows:

$$R_2 = \frac{cT_{D2}f_{B2}}{2B_2}.$$

In one or more embodiments the apparatus is configured to;

- determine the first dominant frequency component of the first beat frequency signal by determination of a Fourier transform of the first beat frequency signal and assigning values indicative of the amplitude of the Fourier transformed first beat frequency signal at a particular frequency to a first predetermined number of frequency-spaced bins, the frequency-spaced bins thereby each indicative of a different range of beat frequencies based on a resolution dependent on the first bandwidth of the first frequency varying detection signal;
- determine the second dominant frequency component of the second beat frequency signal by determination of a Fourier transform of the second beat frequency signal and assigning values indicative of the amplitude of the Fourier transformed first beat frequency signal at a particular frequency to a second predetermined number of frequency-spaced bins, the frequency-spaced bins thereby each indicative of a different range of beat frequencies based on a resolution dependent on the second bandwidth of the second frequency varying detection signal;
- determine which one of the bins of the first predetermined number of frequency-spaced bins contains the first dominant frequency component;
- convert the first dominant frequency component into the first estimated range;
- determine which one of the bins of the second predetermined number of frequency-spaced bins contains the second dominant frequency component;

convert the second dominant frequency component into the second estimated range;

based on an overlap in the range of distances covered by each of the identified bins the apparatus is configured to determine the range to the remote object having a resolution based on the overlap in range of beat frequencies.

In one or more embodiments the second bandwidth of the second frequency varying detection signal is determined based on the determination of the first estimated range.

In one or more embodiments the second bandwidth of the second frequency varying detection signal is determined based on the first bandwidth and the number of the $n^{th}$ bin, wherein the first dominant frequency component is found in the $n^{th}$ bin and bins are numbered consecutively from 1, as $$B_2 = \frac{(n-1)B_1}{(n-1)+1/2}.$$

In one or more embodiments the apparatus is configured to provide for transmission of the first frequency varying detection signal; determine a first estimated range to the remote object based on the first frequency varying detection signal and the first reflected signal; determine the second bandwidth to provide an improvement in resolution based on the determination of the first estimated range and provide for transmission of the second frequency varying detection signal with the determined second bandwidth; determine a second estimated range to the remote object based on the second frequency varying detection signal and the second reflected signal; and determine the range to the remote object based on the first estimated range and the second estimated range.

According to a second aspect of the present disclosure there is provided a method for detection and ranging of a remote object:

based on a first reflected signal comprising a reflection from the remote object of a first frequency varying detection signal, the first frequency varying detection signal comprising a signal that varies in frequency over a first bandwidth; and based on a second reflected signal comprising a reflection from the remote object of a second frequency varying detection signal, the second frequency varying detection signal comprising a signal that varies in frequency over a second bandwidth, different from the first bandwidth;

determining a first estimated range based on a first beat frequency signal obtained by mixing the first reflected signal and the first frequency varying detection signal, the first estimated range having a first resolution by virtue of the first bandwidth of the first frequency varying detection signal;

determining a second estimated range based on a second beat frequency signal obtained by mixing the second reflected signal and the second frequency varying detection signal, the second estimated range having a second resolution by virtue of the second bandwidth of the second frequency varying detection signal;

determining a range of the remote object as a function of the first estimated range and the second estimated range.

In one or more embodiments the method comprises determining a first spread of ranges based on the first estimated range and the resolution of the first estimated range according to the first bandwidth;

determining a second spread of ranges based on the second estimated range and the resolution of the second estimated range according to the second bandwidth;

wherein the resolution, $\Delta R$, is calculated as a function of the bandwidth, B, and the speed of light, c, using:

$$\Delta R = c/(2B),$$

and wherein determining the range of the remote object comprises a function based on an overlap in the first and second spread of ranges.

In one or more embodiments, the first estimated range is based on a first dominant frequency component of the first beat frequency signal and the step of determining the first estimated range comprises converting the first dominant frequency component, $f_{B1}$, of the first beat frequency signal to the first estimated range, $R_1$, as a function of the speed of light, c, the first total sweep time, $T_{D1}$, wherein the first total sweep time is the period over which the first frequency varying detection signal is transmitted, and the first bandwidth, $B_1$ as follows:

$$R_1 = \frac{cT_{D1}f_{B1}}{2B_1}$$

And the second estimated range is based on a second dominant frequency component of the second beat frequency signal and the step of determining the second estimated range comprises converting the second dominant frequency component, $f_{B2}$, of the second beat frequency signal to the second estimated range, $R_2$, as a function of the speed of light, c, the second total sweep time, $T_{D2}$, wherein the second total sweep time is the period over which the second frequency varying detection signal is transmitted, and the second bandwidth $B_2$ as follows:

$$R_2 = \frac{cT_{D2}f_{B2}}{2B_2}.$$

In one or more embodiments the method comprises the step of determining the first dominant frequency component of the first beat frequency signal by determining a Fourier transform of the first beat frequency signal and assigning values indicative of the amplitude of the Fourier transformed first beat frequency signal at a particular frequency to a first predetermined number of frequency-spaced bins, the frequency-spaced bins thereby each indicative of a different range of beat frequencies based on a resolution dependent on the first bandwidth of the first frequency varying detection signal;

determining the second dominant frequency component of the second beat frequency signal by determining a Fourier transform of the second beat frequency signal and assigning values indicative of the amplitude of the Fourier transformed first beat frequency signal at a particular frequency to a second predetermined number of frequency-spaced bins, the frequency-spaced bins thereby each indicative of a different range of beat frequencies based on a resolution dependent on the second bandwidth of the second frequency varying detection signal;

determining which one of the bins of the first predetermined number of frequency-spaced bins contains the first dominant frequency component;

converting the first dominant frequency component into the first estimated range;

determining which one of the bins of the second predetermined number of frequency-spaced bins contains the second dominant frequency component;

converting the second dominant frequency component into the second estimated range;

based on an overlap in the range of distances covered by each of the identified bins, determining the range to the remote object having a resolution based on the overlap in range of beat frequencies.

In one or more embodiments the method further comprises the step of determining the second bandwidth of the second frequency varying detection signal based on the first bandwidth and the number of the $n^{th}$ bin, wherein the first dominant frequency component is found in the $n^{th}$ bin and bins are numbered consecutively from 1, as follows:

$$B_2 = \frac{(n-1)B_1}{(n-1)+1/2}.$$

According to a third aspect of the present disclosure there is provided a computer program product comprising computer program code which, when executed by a processor, is configured to perform the method of the second aspect.

According to a fourth aspect of the present disclosure there is provided an automotive radar system comprising the apparatus of the first aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 1 shows a schematic diagram showing an example embodiment of an automotive radar system including the apparatus;

FIGS. 2A-2C show an example embodiment of how a frequency varying detection signal, a reflected signal and a beat frequency signal vary with time and how a dominant frequency component of the beat frequency signal may be visualised in frequency space;

FIG. 3A-3C show an example embodiment of how first and second frequency varying detection signals, first and second reflected signals and first and second beat frequency signals vary with time and how first and second dominant frequency components of first and second beat frequency signals may be visualised in frequency space;

FIG. 4 shows an example embodiment of the calculation of a determined range with an improved resolution;

Figure 5:
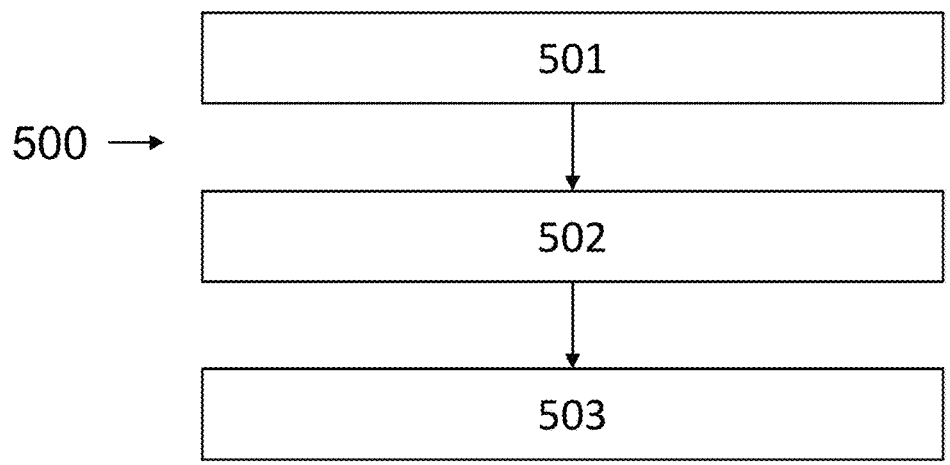
FIG. 5 shows an example method.

Radar systems are becoming increasingly common in the automotive industry. These systems are used, for example, as sensors for assisted parking, automatic cruise control speed adjustment (adaptive cruise control), headway alert, collision warning and mitigation and brake support. We describe example embodiments that provide for an advantageous multi-use radar system which combines the functionalities mentioned above with a wireless signalling system for communication with a remote device.

Radar (originally an acronym, RADAR) stands for RAdio Detection And Ranging. While radar technology was originally directed towards the use of radio frequency electromagnetic waves for detection and ranging, this term is now often used generically for electromagnetic waves of any frequency that are used for detection and ranging purposes.

A radar system performs detection and ranging by transmitting an electromagnetic wave, such as a pulse, from a transmission antenna and measuring the time taken for the reflected wave to be detected at a receiving sensor. The amount of time taken for a reflected wave to reach an obstacle and be reflected back provides an indication of the range of that obstacle from the radar system. By using a series of pulses or a continuous wave mode of operation (such as in a continuous wave radar), a time-resolved range profile of a space around a radar system may be obtained. It will be appreciated that any action which includes the ranging of a remote object will inherently include the action of detecting said remote object.

FIG. 1 shows an apparatus 100 configured to provide for detection and ranging of a remote object 102, the apparatus configured to perform the following: based on a first reflected signal 106 comprising a reflection from the remote object 102 of a first frequency varying detection signal 105, the first frequency varying detection signal 105 comprising a signal that varies in frequency over a first bandwidth; and a second reflected signal 108 comprising a reflection from the remote object 102 of a second frequency varying detection signal 107, the second frequency varying detection signal 107 comprising a signal that varies in frequency over a second bandwidth, different from the first bandwidth; determine a first estimated range based on a first beat frequency signal 216 obtained by mixing the first reflected signal 206 and the first frequency varying detection signal 205, the first estimated range having a first resolution by virtue of the first bandwidth of the first frequency varying detection signal 205; determine a second estimated range based on a second beat frequency signal 217 obtained by mixing the second reflected signal 208 and the second frequency varying detection signal 207, the second estimated range having a second resolution by virtue of the second bandwidth of the second frequency varying detection signal 207; determine a range of the remote object 102 as a function of the first estimated range and the second estimated range.

The range of the remote object 102 may be determined based on a distance from a transmitter/receiver 103 that transmits the first and second frequency varying detection signals 105, 107 and receives the first and second reflected signals 106, 108, although it will be appreciated that with knowledge of the location of the transmitter/receiver 103, the range to the remote object 102 to any other known location can be determined. The transmitter/receiver 103 in this example comprises an automotive radar system, although it will be appreciated that in other examples the radar system may be used in fields other than automotive.

The apparatus 100 may comprise at least one of (i) at least part of the automotive radar system 103, such as circuitry or a module of the same; (ii) a remote apparatus in communication with the automotive radar system 103 for control thereof and/or receipt of information therefrom; (iii) at least part of a user-interface-providing-device for an automobile, such as circuitry or a module of the same; and (iv) software or firmware for the automotive radar system 103. The apparatus 100 may be pre-installed in an automobile or it may be retro-fitted therein. Optionally, the apparatus 100 may provide for communication with a user device 104, such as using a communication element 101, to provide the determined range to the device 104.

Examples of devices 104 may comprise user devices which may include any device which may provide information to a user such as a dashboard indicator light, an on-board computer screen, a heads-up windscreen projection display or a mobile phone alert; or safety devices which may include automatic emergency braking, radar guided cruise control, road lane keeping assistance and autonomous driving.

The apparatus 100 may be configured to provide signalling to cause the automotive radar system 103 to transmit one or more of the first frequency varying detection signal 105 and the second frequency varying detection signal 107. Alternatively, the automotive radar system 103 may be configured to transmit the frequency varying detection signals 105, 107 and the apparatus 100 may be configured only to determine the range of the remote object 102 based on the transmitted signals 105, 107 and the received, reflected signals 106, 108.

In one or more embodiments, the frequency varying detection signals 105, 107 are transmitted from, and the reflected signals 106, 108 are received by, an automotive radar system 103 incorporated into an automotive vehicle. In this embodiment, the remote object 102 may be any object that comes within range of the automotive radar system 103, such as another automotive vehicle, a pedestrian or an obstacle. In other embodiments, the automotive radar system 103 may be incorporated into another type of vehicle, such as a boat or an aeronautical vehicle. While an automotive radar system is referred to frequently in the described embodiments, it will be appreciated that the radar system described herein may be used in devices other than an automotive vehicle.

FIG. 2A shows an example of the variation of a transmission frequency (on the y-axis 202) of the first frequency varying detection signal 205 over time (on the x-axis 201). It can be seen from FIG. 2A that the frequency of the first frequency varying detection signal 205 varies in frequency over a fixed sweep time, $T_D$, represented by the extent of line 205. The first frequency varying detection signal 205 varies from a predetermined starting frequency, $f_c$, to a frequency equal to the starting frequency, $f_c$, plus the first bandwidth, $B_1$. After the automotive radar system has transmitted a first sweep from $f_c$ to $f_c+B_1$, the automotive radar system may be configured to begin a second sweep from $f_c$ to $f_c+B_1$. Repetitive sweeps may allow continuous ranging operations to be performed.

Similarly, FIG. 2A shows the first reflected signal 206 as it is received at the automotive radar system 103. The first reflected signal 206 is generated when the first frequency varying detection signal 205 is reflected from the remote object 102 back to the automotive radar system 103. Thus, the first reflected signal 206 may be considered as a frequency varying reflected signal.

An estimated range of the remote object 102 may be determined as a function of the time delay, $t_d$, between sending the first frequency varying detection signal 205 and receiving the first reflected signal 206. However, for a continuous wave radar system the range to the remote object 102 may be determined from a beat frequency obtained by mixing the received first reflected signal 206 with the transmitted first frequency varying signal 205 and identifying a dominant or peak frequency component. The range may be determined from the frequency of that dominant or peak frequency component. Arrow 211 shows an example of the frequency offset between the first reflected signal 206 and the first frequency varying detection signal 205.

FIG. 2B shows the result of mixing the first reflected signal 206 with the first frequency varying detection signal 205. The result of this mixing is a beat frequency signal 208. Mixing may involve a step of performing a mathematical operation on the signals, such as multiplying the signals by one another. In other example, the mixing may include adding the signals to one another or subtracting one signal from the other. It will be appreciated that a range of methods of mixing signals may be considered by the skilled person and that certain mathematical operations may be equivalent to other mathematical operations by virtue of known equivalence identities, such as trigonometric identities. The beat frequency signal 216, if there is a remote object 102 present, comprises a dominant frequency component. The example beat frequency signal in FIG. 2B show a simple sinusoidal signal, though it will be appreciated that the beat frequency may be more complex than this signal, comprising a range of different frequency components. Where the beat frequency signal comprises a range of frequency components, one of the frequency components (comprising a signature of the remote object 102) may be the dominant frequency component of that signal.

In FIG. 2, dotted lines 218 represent a time period over which one or more of: mixing the first frequency varying detection signal and the first reflected signal is performed; and sampling of the mixed signals is performed. In FIG. 2, the time period over which either of the above operations are performed begins at a short time period after the first portion of the first reflected signal is received and ends a short time period before the end of the first frequency varying detection signal output. It will be appreciated that performing either of the above operations over this time period may be particularly advantageous in a system which may be constrained by device limitations. In an embodiment wherein device limitations are negligible, either of the above two operations may be started as soon as the first reflected signal is received at the automotive radar system 103 and may be ended when the frequency of the first frequency varying detection signal reaches $f_c+B_1$. Thus, in one or more examples, the apparatus may be configured to determine the beat frequency signal(s) based on the frequency varying detection signal and corresponding reflected signal temporally defined as a first threshold time after initial receipt of the reflected signal and/or a second threshold time prior to completion of the frequency sweep of the detection signal.

FIG. 2C shows a Fourier transform of the beat frequency signal 216 wherein the dominant frequency component is identified as peak 210. In FIG. 2C, frequency is provided along the x-axis 203 and amplitude is shown along the y-axis 204. The dominant frequency component may be used to determine an estimated range of the remote object. The Fourier transform may comprise a Fast Fourier Transform (FFT) or another mathematical method in order to determine the dominant frequency component from the beat frequency signal 216. It will be appreciated that the Fourier transform of a more complex beat frequency signal 216 may produce a signal with multiple peaks at different frequency values along the x-axis of FIG. 2. The multiple peaks may comprise the signatures of different remote objects at different ranges or at least some of them may be due to noise. However, for simplicity, we will consider beat frequency signals where there is a single peak, e.g. comprising the signature of the remote object 102. The identification of a peak may be performed by any appropriate method, such as by identifying frequency components where the amplitude is above a predetermined threshold or by using a peak detection algorithm, which may be known to those skilled in the art.

The dominant frequency component $f_B$ can then be used to determine the range, R, to the remote object 102. The following equation gives the range of an object;

$$R=(c*T_D*f_B)/(2B) \qquad (1)$$

Where $T_D$ is the fixed sweep time, c is the speed of light and B is the bandwidth of the transmitted signal, e.g. $B_1$.

The resolution of the range is related to the bandwidth of the frequency varying detection signal used. The resolution $\Delta R$ is related to bandwidth as follows;

$$\Delta R=c/(2 \cdot B) \qquad (2)$$

Where c is the velocity of light and B is the bandwidth.

One method for determining the range to a remote object 102 is to sample the Fourier transform of the beat frequency signal. Accordingly, the apparatus 100 may be configured sample the Fourier transform of the beat frequency signal over predetermined time periods, δt. The method may comprise, metaphorically, placing the sampled values in a plurality of "bins" shown as circles 214. The act of performing/sampling the Fourier transform over time periods δt may inherently provide a range of possible bins of a resolution, in frequency space, which corresponds to the time period δt. Thus, the sampled value in each bin may represent the amplitude of the Fourier transform of the beat frequency signal at a specific beat frequency or over a specific range of beat frequencies. In frequency space, the frequency resolution of the bins may be independent of the bandwidth of the frequency dependent detection signal used. The x-axis of FIG. 2C is a frequency axis.

The identification of a peak or dominant frequency component by consideration of which bin contains the dominant sampled value (e.g. highest amplitude of the Fourier transform) may yield an estimate of the range to the remote object using equation 1 above, where $f_B$ comprises the beat frequency of the bin containing the dominant frequency component. However, the accuracy of the estimate is dependent at least on the bandwidth of the frequency varying detection signal. The sampling rate and therefore the number of bins used in the method may also affect the resolution of the estimated range because a low sample rate may not accurately identify at what beat frequency a peak is present. It will be appreciated that with a sufficiently high sampling rate, the bandwidth of the frequency varying detection signal may be the dominant factor in the resolution of the estimated range.

FIGS. 3A-3C show the case wherein two frequency varying detection signals 205, 207 are transmitted from an automotive radar system 103 with different bandwidths $B_1$ and $B_2$, respectively. As can be seen in FIG. 3A, the first and second frequency varying detection signals 205, 207 are transmitted at the same time and therefore the first and second reflected signals 206, 208 corresponding to the reflections of the first and second frequency varying detection signals 205, 207 are received at the same time. However, it will be appreciated that the first frequency varying detection signal 205 and the second frequency varying detection 207 may be emitted at different times. In one or more embodiments, time division multiplexing may be used. Further, it will be appreciated that the first frequency varying detection signal 205 may be transmitted and the first reflected signal 206 received prior to the transmission of the second frequency varying detection signal 207 and subsequent receipt of its reflected signal 208. The reflected signals 206, 208 have different frequency offsets from the corresponding frequency varying detection signals 205, 207 which are being output at the time of receipt, as represented by arrows 211 and 212. The frequency offset 211, 212 may be related to the bandwidth and sweep time (the time over which the frequency of the frequency varying signals increase from starting frequency $f_c$ to frequency $f_c+B$) and the range of the remote object.

In the example of FIG. 3A, the first frequency varying detection signal 205 has a larger bandwidth $B_1$ than the second frequency varying detection 207 signal which has a bandwidth $B_2$. It will be appreciated that in some embodiments $B_2$ may be larger than $B_1$.

FIG. 3B shows the first 216 and second 217 beat frequency signals. As described above, the first beat frequency signal 216 is obtained by mixing the first frequency varying detection signal 205 and the first reflected signal 206 and the second beat frequency signal 217 is obtained by mixing the second frequency varying detection signal 207 and the second reflected signal 208. It will be appreciated that the two signals in FIG. 3B have been offset from one-another in order to provide clarity to the figure.

FIG. 3C shows the Fourier transforms of the first and second beat frequency signals.

The first dominant frequency component 210 of the first beat frequency signal 216 corresponds to a first estimated range to the remote object 102 and the second dominant frequency component 213 of the second beat frequency signal 217 corresponds to a second estimated range to the remote object 102. The first and second estimated ranges may be calculated by way of equation (1), above. From equation (2), it can be seen that, even if the first dominant frequency component 210 and the second dominant frequency component 213 fall within the same bin (representing a common beat frequency as shown in FIG. 3C), the difference in the bandwidths, $B_1$ and $B_2$, may result in different range measurements with different range resolutions because of the different bin size and position when converted into distance space. Thus, based on equations 1 and 2, each bin may represent a different range of distances to the remote object. It will be appreciated that the first and second estimated range may be combined in a number of ways in order to determine an estimated range of the remote object.

In one embodiment, the time delay, $t_d$, between the output of a first frequency varying detection signal 205 and the receipt of the corresponding reflected signal 206 divided by the total time, $T_D$, over which the sweep is performed can be calculated as a function of the first dominant frequency component $f_{B1}$ 210 of the first beat frequency signal 216 and the bandwidth of the signal $B_1$ as:

$$\frac{t_d}{T_s} = \frac{f_{B1}}{B_1} \quad (3)$$

A first distance or range can be determined from this value by understanding that the time delay $t_d$ must be twice the length of time light takes to travel to the remote object and back divided by the speed of light, c. Thus, $t_d$ in the above equation can be substituted and the equation rearranged to provide a first estimate of the range to the remote object 102, $R_1$, as a function of the first dominant frequency component 210 of the first beat frequency signal 216:

$$R_1 = \frac{cT_D f_{B1}}{2B_1} \quad (4)$$

An equivalent calculation can be performed using the second dominant frequency component 213 $f_{B2}$ of the second beat frequency signal 217 and the second bandwidth $B_2$ to determine a second distance or range, $R_2$. The range to the remote object may then be determined based on the first and second ranges, such as an average of the first and second ranges.

In another example, the range to the remote object may be determined from the first and second frequency varying signals and their reflections based on the sampled Fourier transform methodology described above.

The determination of the bin into which the dominant frequency component of the beat frequency signal falls may be performed by the apparatus. Alternatively, a separate element may determine into which bin the dominant frequency component of the beat frequency belongs and the apparatus may be configured to determine the range of the remote object 102 as a function of the first and second reflected signals and the first and second frequency varying detection signals.

FIG. 4 shows an example of an alternative way to visualise the bins described in relation to FIG. 3C. In FIG. 4, first and second rows of bins 400 and 401 are depicted which correspond to possible range estimates to the remote object calculated from the first and second reflected signals 206, 208 and the first and second frequency varying detection signals 205, 207. In this instance, instead of depicting the central points of the bins along the frequency axis (as in FIGS. 2C and 3C which use circles 214 and 215), each bin has been represented as a box with an upper bound 402 and a lower bound 403 along an axis 408 that represents distance to the remote object. Thus, in the representation of FIG. 4, equations (2) and (4) have been applied to the bin frequencies of FIG. 3C in order to convert the frequency space bins 214 and 215 of FIG. 3C onto a distance axis 408. The different bandwidths of the first and second frequency varying detection signals result in different resolutions of the bins on the distance axis 408. Row 400 corresponds to the bins 214 of the first beat frequency signal 216 and row 401 corresponds to the bins 215 of the second beat frequency signal 217. Thus, upon performing a Fourier transform on the first beat frequency signal 216 and sampling the resulting signal into the bins 214, the first dominant frequency component 210 of the first beat frequency signal 216 may be determined to lie within one of the bins of the first row 400. Equivalently, upon performing a Fourier transform on the second beat frequency signal 217 and sampling the resulting signal into the bin s215, the second dominant frequency component 213 of the second beat frequency signal 217 may be determined to lie within one of the bins of the second row 401. In the present example, the sampling rate of both the first frequency varying detection signal 205 and the second frequency varying detection signal 207 are the same. In other embodiments, the sampling rate for each set of signals may be different, thereby providing a different number of bins associated with each of the first range estimate and the second range estimate.

As is the case for each bin, the $n^{th}$ bin of row 400 has a lower bound 402 and an upper bound 403. The difference between the lower and upper bound 402, 403 can be considered to be the range resolution of the sampled estimated range that the bin represents. The values between bounds 402 and 403 correspond to the estimated range which the bin represents. It can be seen that an equivalent set up is shown for the second row 401, wherein the lower bound of the $n^{th}$ bin is shown at 404 and the upper bound of the $n^{th}$ bin is shown at 405. Each bin is arranged adjacent its preceding and proceeding neighbours thus providing consecutive sampled distance ranges each with an associated resolution. Thus, the lower bound 402 of the $n^{th}$ bin corresponds to the upper bound of the $(n-1)^{th}$ bin and the upper bound of the $n^{th}$ bin 403 corresponds to the lower bound of the $(n+1)^{th}$ bin.

In the examples provided herein, the total sweep time for the first frequency varying detection signal and the second frequency varying detection signal have been assumed to be the same. It will be appreciated that the sweep time for the two frequency varying detection signals may be different, thereby providing a sweep time $T_{D1}$ corresponding to the sweep time of the first frequency varying detection signal and a sweep time $T_{D2}$ corresponding to the sweep time of the second frequency varying detection signal.

The maximum range the system can determine is a function of the total sweep time, $T_D$. The reason for this is that if a reflected signal 206, 208 is received at the automotive radar system 103 after time $T_D$ from being emitted as a frequency varying detection signal 205, 207, the reflected signal will be indistinguishable from a reflection of any subsequent sweep, thus two possible ranges may be estimated, one being very close to the automotive radar system and one being an integer multiple of the maximum detectable range further away.

The number of bins is determined by the number of times the beat frequency is sampled over the total sweep time, $T_D$. Sampling may be performed over a sampling time period, $\delta t$, which may be equal to the inverse of two times the starting frequency $f_c$, i.e. $\delta t = 1/(2f_c)$. The total number of bins for the first range estimate, N, may then be equal to the total time $T_D$ divided by the sampling time period $\delta t$. After performing the Fourier transform on the beat frequency, two possible dominant frequency components with equal magnitudes may be determined: a positive dominant frequency component and a negative dominant frequency component. The determination of both a positive and negative value is an inherent feature of performing a Fourier transform. In this case the negative dominant frequency component may not be considered, as it may not have a practical significance. A result of performing a Fourier transform may be that the available bins, N, must be split around 0 to encompass both positive and negative values, thus only $N/2$ ($=T/(2\delta t)$) bins will actually be available. Due to the non-physical and non-practical consequences of the negative bin values and the negative range estimates, these have not been considered in detail throughout the above description.

According to equation (2), the resolution of the first range estimate, $\Delta R_1$, of each bin may, therefore, be equal to $c/(2B_1)$, where c is the speed of light and $B_1$ is the first bandwidth. Equivalently, the resolution for the second range estimate, $\Delta R_2$, of each bin may, therefore, be equal to $c/(2B_2)$, wherein c is the speed of light and $B_1$ is the second bandwidth.

As an example of one manner of determining range of a remote object 102 as a function of the dominant frequency components 210, 213 of the first and second beat frequency signals 216, 217 (which themselves are functions of the first and second frequency varying detection signals 205, 207 and the first and second reflected signals 206, 208) shall be provided below.

In this example the first dominant frequency component 210 of the first beat frequency signal 216 falls within the $n^{th}$ bin in row 400 and the second dominant frequency component 213 of the second beat frequency signal 217 also falls within the $n^{th}$ bin in row 401. As discussed previously, this provides two different range estimates. In another example, the first dominant frequency component 210 may fall within the $n^{th}$ bin while the second dominant frequency component 213 may fall within a different bin, such as the $(n+1)^{th}$ bin. In this example, it can be surmised that a more accurate determination of the range must lie within the portions of the two bins which overlap, which may define a narrower range of beat frequencies than covered by the $n^{th}$ bins individually.

In order to determine the range of the remote object 102, the apparatus 100 may be configured to determine which of the first lower bound 402 of the $n^{th}$ bin of the first row 400 and the second lower bound 404 of the $n^{th}$ bin of the second row 401 has a higher frequency value and set that frequency value as a third lower bound 406. The apparatus 100 may further be configured to determine which of the first upper bound 403 of the $n^{th}$ bin of the first row 400 and the second upper bound 405 of the $n^{th}$ bin of the second row 401 has a lower frequency value and set that frequency value as a third upper bound 407. The third resolution may be defined as the difference between the third lower bound 406 and the third upper bound 407. The determined range to the remote object 102 may be determined to be the midpoint of the third lower bound 406 and the third upper bound 407. Thus, determining the range to the remote object 102 using the overlap in range estimate of the bins containing a peak amplitude results in a determined range which is narrower (has a higher resolution) than either of the first estimated range or the second estimated range.

Alternatively, in one or more examples, only one of a third upper bound 407 or a third lower bound 406 may be calculated and used in combination with the one of the lower bounds of the nth bins of the first and second rows or the upper bounds of one of the $n^{th}$ bins of the first and second rows 400, 401 respectively, in order to provide an improved range determination. In some examples, one of the first lower bound 402 of the $n^{th}$ bin of the first row 400 may have the same frequency value as the second lower bound 404 of the $n^{th}$ bin of the second row 401 or the first upper bound 403 of the $n^{th}$ bin of the first row 400 may have the same frequency value as the second upper bound 405 of the $n^{th}$ bin of the second row 401.

In one or more embodiments, the apparatus 100 may be configured to determine a first estimated range of a remote object 102 as a function of only the first frequency varying detection signal 205 and the first reflected signal 206. From the determination of the first estimated range, a second frequency bandwidth may be selected for a second frequency varying detection signal 207 as a function of the first estimated range. The apparatus 100 may be configured to select the second bandwidth such that only one bound between adjacent bins of the second row of bins 401 intersects with the bin corresponding to the determined bin of the first row 400. For example, the selection of the second bandwidth $B_2$ based on the first bandwidth $B_1$ may be based on the following equation, wherein (n-1) is the number of the $(n-1)^{th}$ bin:

$$B_2 = \frac{(n-1)B_1}{(n-1)+1/2} \quad (5)$$

The apparatus 100 may be configured to send signalling representative of the determined range, and optionally, the resolution of the determined range, to the device 104. For example, signalling may be sent to cause a driver feedback element of a vehicle to provide feedback if the remote object is within a predetermined range. Alternatively, signalling may be sent to one or more warning, navigation, driver assistance or safety systems for use thereby. For example, the determined range may be sent to an automatic braking safety system to cause automatic braking in the event a possible collision with the remote object is determined. Alternate warning, slowing or safety mechanisms may be provided. The warning, navigation, driver assistance or safety systems may be provided for other vehicles beside the example automobile recited above, such as buses, lorries, aeroplanes and boats.

In the embodiments presented in the figures, two frequency varying detection signals are used in order to provide an improved range. In one or more embodiments, three frequency varying detection signals may be transmitted of different bandwidths by the automotive radar system 103, three corresponding reflected signals may be received, three dominant components of three beat frequency signals calculated and, therefrom, three estimated ranges of the remote object 102 may be determined. A range of the remote object 102 may be determined from the three estimated ranges. For example, the lower bound of the determined range may comprise the highest of lower bounds of the bins of the three distance estimates. The upper bound of the determined range may comprise the lowest of the upper bounds of the bins of the three distance estimates. The determined range may comprise the half-way point between the lower bound of the determined range and the upper bound of the determined range. In another embodiment, more than three distance estimates may be determined and the determined range may be a function of each of the distance estimates.

The automotive radar system 103 may be configured to output frequency varying detection signals in the form of electromagnetic waves. The frequencies of the frequency varying detection signals may be within the microwave frequency range. For example, the frequencies may be between 1-300 GHz. In particular, the frequencies may be between 20-200 GHz or between 30-100 GHz. As a specific example, the frequency of the microwaves may be approximately 77 GHz with a bandwidth of up to 1 GHz or the frequency of the microwaves may be approximately 79 GHz with a bandwidth of up to 4 GHz. Accordingly, the first and second bandwidths may be within these limits. In some example embodiments, these frequency ranges may be particularly advantageous for an automotive radar system 103 because these frequencies may lie within regulated frequency bands for automotive radar systems. Alternatively, other frequencies may be used where allowable by relevant national regulations. Accordingly, the wireless signals output by the automotive radar system 103 may comprise carrier waves for information intended for the remote device 102.

FIG. 5 shows a flow chart representing the steps of a method 500 of the present disclosure. Based on a first reflected signal comprising a reflection from a remote object of a first frequency varying detection signal, the method comprises the step of determining a first estimated range 501 based on a first beat frequency signal obtained by mixing the first reflected signal and the first frequency varying detection signal, the first estimated range having a first resolution by virtue of the first bandwidth of the first frequency varying detection signal. Further, based on a second reflected signal comprising a reflection from the remote object of a second frequency varying detection signal, the second frequency varying detection signal comprising a signal that varies in frequency over a second bandwidth, different from the first bandwidth, the method comprises the step of determining a second estimated range 502 based on a second beat frequency signal obtained by mixing the second reflected signal and the second frequency varying detection signal, the second estimated range having a second resolution by virtue of the second bandwidth of the second frequency varying detection signal. The method further comprises the step of determining a range of the remote object 503 as a function of the first estimated range and the second estimated range.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs) having memory associated therewith. The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Figure 6:
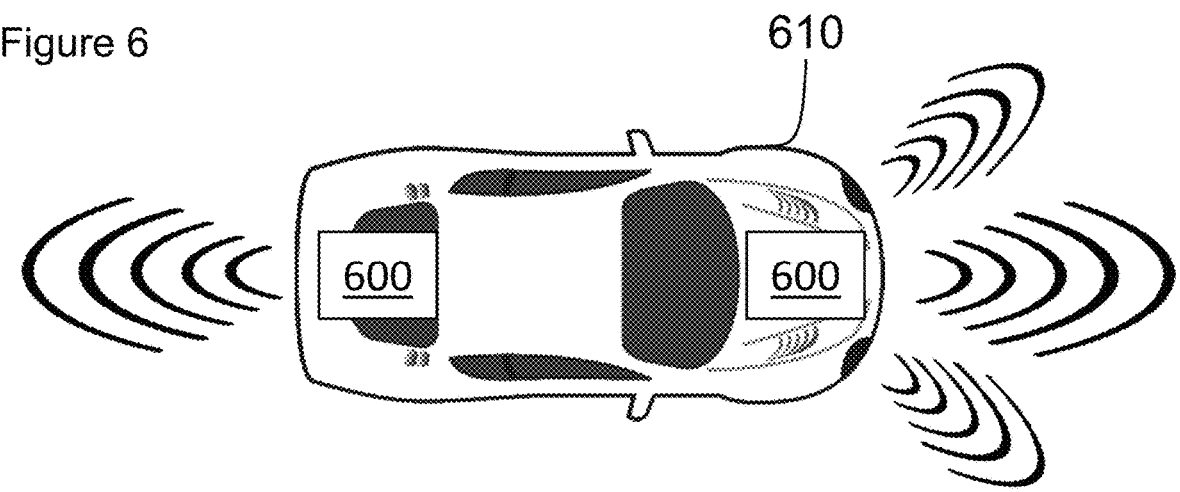
FIG. 6 shows an example automotive vehicle comprising an automotive radar system.
Figure 7:
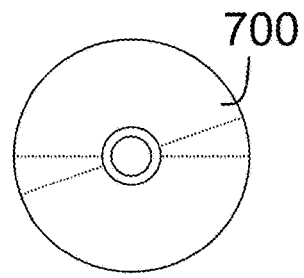
FIG. 7 shows a computer readable medium.

FIG. 6 shows an automobile 610 that may comprise a system 600 comprising the apparatus 100 and automotive radar system 103 described above. The automobile may comprise a car, a self-driving car, a truck, a lorry, a van, a caravan, a motorbike, a utility vehicle, a boat, a ship, a drone, an aircraft or an emergency services vehicle.

In another aspect of the present disclosure, there is a computer program configured to perform the method described above. In an example the computer program is provided by a computer program product 700 comprising a computer readable medium bearing computer program code for execution by a processor associated memory, the computer program code comprising code for performing the method described above. The computer program may be executed by a processor of an automotive radar system 103 or a processor in communication with the automotive radar system 103.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus configured to provide for detection and ranging of a remote object, the apparatus configured to perform the following:
    transmit a first frequency varying detection signal comprising a signal that varies in frequency over a first bandwidth;
    receive a first reflected signal comprising a reflection from the remote object of the first frequency varying detection signal;
    transmit a second frequency varying detection signal comprising a signal that varies in frequency over a second bandwidth, different from the first bandwidth;
    receive a second reflected signal comprising a reflection from the remote object of the second frequency varying detection signal;
    determine a first estimated range based on a first beat frequency signal obtained by mixing the first reflected signal and the first frequency varying detection signal, the first estimated range having a first resolution by virtue of the first bandwidth of the first frequency varying detection signal;
    determine a second estimated range based on a second beat frequency signal obtained by mixing the second reflected signal and the second frequency varying detection signal, the second estimated range having a second resolution by virtue of the second bandwidth of the second frequency varying detection signal;

determine a range of the remote object as a function of the first estimated range and the second estimated range.

2. The apparatus of claim 1, wherein the apparatus is configured to:
determine a first spread of ranges based on the first estimated range and the resolution of the first estimated range according to the first bandwidth;
determine of a second spread of ranges based on the second estimated range and the resolution of the second estimated range according to the second bandwidth;
wherein the resolution, $\Delta R$, is calculated as a function of the bandwidth, B, and the speed of light, c, using:

$$\Delta R = c/(2B),$$

and wherein the range of the remote object comprises a function based on an overlap in the first and second spread of ranges.

3. The apparatus of claim 1, wherein the first estimated range is based on a first dominant frequency component of the first beat frequency signal and the second estimated range is based on a second dominant frequency component of the second beat frequency signal.

4. The apparatus of claim 3, wherein the apparatus is configured to convert the first dominant frequency component, $f_{B1}$, of the first beat frequency signal to the first estimated range, $R_1$, as a function of the speed of light, c, the first total sweep time, $T_{D1}$, wherein the first total sweep time is the period over which the first frequency varying detection signal is transmitted, and the first bandwidth, $B_1$ as follows:

$$R_1 = cT_{D1}f_{B1}/2B_1$$

and the apparatus is configured to covert the second dominant frequency component, $f_{B2}$, of the second beat frequency signal to the second estimated range, $R_2$, as a function of the speed of light, c, the second total sweep time, $T_{D2}$, wherein the second total sweep time is the period over which the second frequency varying detection signal is transmitted, and the second bandwidth $B_2$ as follows:

$$R_2 = cT_{D2}f_{B2}/2B_2.$$

5. The apparatus of claim 4, wherein the apparatus is configured to;
determine the first dominant frequency component of the first beat frequency signal by determination of a Fourier transform of the first beat frequency signal and assigning values indicative of the amplitude of the Fourier transformed first beat frequency signal at a particular frequency to a first predetermined number of frequency-spaced bins, the frequency-spaced bins thereby each indicative of a different range of beat frequencies based on a resolution dependent on the first bandwidth of the first frequency varying detection signal;
determine the second dominant frequency component of the second beat frequency signal by determination of a Fourier transform of the second beat frequency signal and assigning values indicative of the amplitude of the Fourier transformed first beat frequency signal at a particular frequency to a second predetermined number of frequency-spaced bins, the frequency-spaced bins thereby each indicative of a different range of beat frequencies based on a resolution dependent on the second bandwidth of the second frequency varying detection signal;
determine which one of the bins of the first predetermined number of frequency-spaced bins contains the first dominant frequency component;
convert the first dominant frequency component into the first estimated range;
determine which one of the bins of the second predetermined number of frequency-spaced bins contains the second dominant frequency component;
convert the second dominant frequency component into the second estimated range;
based on an overlap in the range of distances covered by each of the identified bins the apparatus is configured to determine the range to the remote object having a resolution based on the overlap in range of beat frequencies.

6. The apparatus of claim 5, wherein the second bandwidth of the second frequency varying detection signal is determined based on the determination of the first estimated range.

7. The apparatus of claim 6, wherein the second bandwidth of the second frequency varying detection signal is determined based on the first bandwidth and the number of the $n^{th}$ bin, wherein the first dominant frequency component is found in the $n^{th}$ bin and bins are numbered consecutively from 1, as follows:

$$B_2 = (n-1)B_1/((n-1)+\tfrac{1}{2}).$$

8. The apparatus of claim 1, wherein the apparatus is configured to provide for transmission of the first frequency varying detection signal; determine a first estimated range to the remote object based on the first frequency varying detection signal and the first reflected signal; determine the second bandwidth to provide an improvement in resolution based on the determination of the first estimated range and provide for transmission of the second frequency varying detection signal with the determined second bandwidth; determine a second estimated range to the remote object based on the second frequency varying detection signal and the second reflected signal; and determine the range to the remote object based on the first estimated range and the second estimated range.

9. A method for detection and ranging of a remote object:
transmitting a first frequency varying detection signal comprising a signal that varies in frequency over a first bandwidth;
receiving a first reflected signal comprising a reflection from the remote object of the first frequency varying detection signal;
transmitting a second frequency varying detection signal comprising a signal that varies in frequency over a second bandwidth, different from the first bandwidth;
receiving a second reflected signal comprising a reflection from the remote object of the second frequency varying detection signal;
determining a first estimated range based on a first beat frequency signal obtained by mixing the first reflected signal and the first frequency varying detection signal, the first estimated range having a first resolution by virtue of the first bandwidth of the first frequency varying detection signal;
determining a second estimated range based on a second beat frequency signal obtained by mixing the second reflected signal and the second frequency varying detection signal, the second estimated range having a second resolution by virtue of the second bandwidth of the second frequency varying detection signal;
determining a range of the remote object as a function of the first estimated range and the second estimated range.

10. The method of claim 9 further comprising:
determining a first spread of ranges based on the first estimated range and the resolution of the first estimated range according to the first bandwidth;
determining a second spread of ranges based on the second estimated range and the resolution of the second estimated range according to the second bandwidth;
wherein the resolution, $\Delta R$, is calculated as a function of the bandwidth, B, and the speed of light, c, using:

$$\Delta R = c/(2B),$$

and wherein determining the range of the remote object comprises a function based on an overlap in the first and second spread of ranges.

11. The method of claim 9 wherein the first estimated range is based on a first dominant frequency component of the first beat frequency signal and the step of determining the first estimated range comprises converting the first dominant frequency component, $f_{B1}$, of the first beat frequency signal to the first estimated range, $R_1$, as a function of the speed of light, c, the first total sweep time, $T_{D1}$, wherein the first total sweep time is the period over which the first frequency varying detection signal is transmitted, and the first bandwidth, $B_1$ as follows:

$$R_1 = c T_{D1} f_{B1} / 2 B_1$$

and the second estimated range is based on a second dominant frequency component of the second beat frequency signal and the step of determining the second estimated range comprises converting the second dominant frequency component, $f_{B2}$, of the second beat frequency signal to the second estimated range, $R_2$, as a function of the speed of light, c, the second total sweep time, $T_{D2}$, wherein the second total sweep time is the period over which the second frequency varying detection signal is transmitted, and the second bandwidth $B_2$ as follows:

$$R_2 = c T_{D2} f_{B2} / 2 B_2.$$

12. The method of claim 11 further comprising:
determining the first dominant frequency component of the first beat frequency signal by determining a Fourier transform of the first beat frequency signal and assigning values indicative of the amplitude of the Fourier transformed first beat frequency signal at a particular frequency to a first predetermined number of frequency-spaced bins, the frequency-spaced bins thereby each indicative of a different range of beat frequencies based on a resolution dependent on the first bandwidth of the first frequency varying detection signal;
determining the second dominant frequency component of the second beat frequency signal by determining a Fourier transform of the second beat frequency signal and assigning values indicative of the amplitude of the Fourier transformed first beat frequency signal at a particular frequency to a second predetermined number of frequency-spaced bins, the frequency-spaced bins thereby each indicative of a different range of beat frequencies based on a resolution dependent on the second bandwidth of the second frequency varying detection signal;
determining which one of the bins of the first predetermined number of frequency-spaced bins contains the first dominant frequency component;
converting the first dominant frequency component into the first estimated range;
determining which one of the bins of the second predetermined number of frequency-spaced bins contains the second dominant frequency component;
converting the second dominant frequency component into the second estimated range;
based on an overlap in the range of distances covered by each of the identified bins, determining the range to the remote object having a resolution based on the overlap in range of beat frequencies.

13. The method of claim 12 wherein the method further comprises the step of determining the second bandwidth of the second frequency varying detection signal based on the first bandwidth and the number of the $n^{th}$ bin, wherein the first dominant frequency component is found in the $n^{th}$ bin and bins are numbered consecutively from 1, as follows:

$$B_2 = (n-1) B_1 / ((n-1) + \frac{1}{2}).$$

14. An automotive radar system configured to provide for detection and ranging of a remote object, the radar system configured to perform:
transmit a first frequency varying detection signal comprising a signal that varies in frequency over a first bandwidth; and
receive a first reflected signal comprising a reflection from the remote object of the first frequency varying detection signal;
transmit a second frequency varying detection signal comprising a signal that varies in frequency over a second bandwidth, different from the first bandwidth;
receive a second reflected signal comprising a reflection from the remote object of the second frequency varying detection signal;
determine a first estimated range based on a first beat frequency signal obtained by mixing the first reflected signal and the first frequency varying detection signal, the first estimated range having a first resolution by virtue of the first bandwidth of the first frequency varying detection signal;
determine a second estimated range based on a second beat frequency signal obtained by mixing the second reflected signal and the second frequency varying detection signal, the second estimated range having a second resolution by virtue of the second bandwidth of the second frequency varying detection signal; and
determine a range of the remote object as a function of the first estimated range and the second estimated range.

15. The radar system of claim 14 further comprising:
determine a first spread of ranges based on the first estimated range and the resolution of the first estimated range according to the first bandwidth;
determine of a second spread of ranges based on the second estimated range and the resolution of the second estimated range according to the second bandwidth;
wherein the resolution, $\Delta R$, is calculated as a function of the bandwidth, B, and the speed of light, c, using:

$$\Delta R = c/(2B),$$

and wherein the range of the remote object comprises a function based on an overlap in the first and second spread of ranges.

16. The radar system of claim 14 further comprising:
provide for transmission of the first frequency varying detection signal;
determine a first estimated range to the remote object based on the first frequency varying detection signal and the first reflected signal;

determine the second bandwidth to provide an improvement in resolution based on the determination of the first estimated range and provide for transmission of the second frequency varying detection signal with the determined second bandwidth;

determine a second estimated range to the remote object based on the second frequency varying detection signal and the second reflected signal; and determine the range to the remote object based on the first estimated range and the second estimated range.

17. The radar system of claim 14 wherein the first estimated range is based on a first dominant frequency component of the first beat frequency signal and the second estimated range is based on a second dominant frequency component of the second beat frequency signal.

18. The radar system of claim 17 further comprising:
convert the first dominant frequency component, $f_{B1}$, of the first beat frequency signal to the first estimated range, $R_1$, as a function of the speed of light, c, the first total sweep time, $T_{D1}$, wherein the first total sweep time is the period over which the first frequency varying detection signal is transmitted, and the first bandwidth, $B_1$ as follows:

$R_1 = cT_{D1}f_{B1}/2B_1$; and covert the second dominant frequency component, fB2, of the second beat frequency signal to the second estimated range, R2, as a function of the speed of light, c, the second total sweep time, TD2, wherein the second total sweep time is the period over which the second frequency varying detection signal is transmitted, and the second bandwidth B2 as follows:

$R_2 = cT_{D2}f_{B2}/2B_2$.

19. The radar system of claim 18 further comprising:
determine the first dominant frequency component of the first beat frequency signal by determination of a Fourier transform of the first beat frequency signal and assigning values indicative of the amplitude of the Fourier transformed first beat frequency signal at a particular frequency to a first predetermined number of frequency-spaced bins, the frequency-spaced bins thereby each indicative of a different range of beat frequencies based on a resolution dependent on the first bandwidth of the first frequency varying detection signal;

determine the second dominant frequency component of the second beat frequency signal by determination of a Fourier transform of the second beat frequency signal and assigning values indicative of the amplitude of the Fourier transformed first beat frequency signal at a particular frequency to a second predetermined number of frequency-spaced bins, the frequency-spaced bins thereby each indicative of a different range of beat frequencies based on a resolution dependent on the second bandwidth of the second frequency varying detection signal;

determine which one of the bins of the first predetermined number of frequency-spaced bins contains the first dominant frequency component;

convert the first dominant frequency component into the first estimated range;

determine which one of the bins of the second predetermined number of frequency-spaced bins contains the second dominant frequency component;

convert the second dominant frequency component into the second estimated range; and based on an overlap in the range of distances covered by each of the identified bins the apparatus is configured to determine the range to the remote object having a resolution based on the overlap in range of beat frequencies.

20. The radar system of claim 19 wherein the second bandwidth of the second frequency varying detection signal is determined based on the determination of the first estimated range.

* * * * *